United States Patent
Deng

(10) Patent No.: US 11,437,862 B2
(45) Date of Patent: Sep. 6, 2022

(54) Q-FACTOR DETECTION METHOD

(71) Applicant: Renesas Electronic America, Inc., Milpitas, CA (US)

(72) Inventor: Chenggang Deng, Chengdu (CN)

(73) Assignee: RENESAS ELECTRONICS AMERICA INC., Milpitas, CA (US)

(*) Notice: Subject to any disclaimer, the term of this patent is extended or adjusted under 35 U.S.C. 154(b) by 0 days.

(21) Appl. No.: 17/010,608

(22) Filed: Sep. 2, 2020

(65) Prior Publication Data

US 2022/0014047 A1    Jan. 13, 2022

(30) Foreign Application Priority Data

Jul. 1, 2020 (CN) .......................... 202010625686.9

(51) Int. Cl.
*H02J 50/60* (2016.01)
*H02J 50/12* (2016.01)
*G01V 3/10* (2006.01)
*H02J 50/40* (2016.01)

(52) U.S. Cl.
CPC .............. *H02J 50/60* (2016.02); *G01V 3/102* (2013.01); *H02J 50/12* (2016.02); *H02J 50/402* (2020.01)

(58) Field of Classification Search
CPC .......... H02J 5/005; H02J 7/0047; H02J 7/025; H02J 50/10; H02J 50/12; H02J 50/402; H02J 50/60

USPC ........................................... 307/104
See application file for complete search history.

(56) References Cited

U.S. PATENT DOCUMENTS

| | | | | |
|---|---|---|---|---|
| 2011/0049997 | A1* | 3/2011 | Urano | H02J 5/005 307/104 |
| 2014/0097791 | A1* | 4/2014 | Lisuwandi | H02J 7/00 320/108 |
| 2017/0346343 | A1* | 11/2017 | Atasoy | H01F 38/14 |
| 2019/0109499 | A1* | 4/2019 | Smith | H02J 50/60 |
| 2019/0140489 | A1* | 5/2019 | Liu | G01R 27/2688 |
| 2019/0238000 | A1* | 8/2019 | Salvekar | H02J 7/025 |
| 2019/0296590 | A1* | 9/2019 | Chae | H02J 50/12 |
| 2019/0326782 | A1* | 10/2019 | Graham | H02J 7/025 |
| 2019/0393731 | A1* | 12/2019 | Maniktala | H02J 50/60 |
| 2020/0185974 | A1* | 6/2020 | Chen | G01R 27/2688 |
| 2020/0251929 | A1* | 8/2020 | Partovi | H02J 50/12 |
| 2021/0281120 | A1* | 9/2021 | Bhandarkar | G01R 27/2611 |

* cited by examiner

*Primary Examiner* — Levi Gannon
(74) *Attorney, Agent, or Firm* — Haynes and Boone, LLP

(57) ABSTRACT

A wireless transmitter with Q-factor measurement is presented. In some embodiments, a method of performing a measurement test in a wireless power transmitter includes adjusting an input voltage to a bridge circuit; setting up transistors in the wireless power transmitter to form an LC oscillating circuit that includes a transmit coil and a capacitor circuit; measuring a VDET sinusoidal voltage from the LC oscillating circuit; and determining a result from the VDET sinusoidal voltage. The result can be calculation of a Q-factor and/or determination of presence of a foreign object.

32 Claims, 12 Drawing Sheets

| FIG. 6-1 | FIG. 6-2 | FIG. 6-3 |

Q-FACTOR DETECTION METHOD

RELATED APPLICATIONS

This application claims priority to Chinese Patent Application No. 202010625686.9 filed 1 Jul. 2020, entitled "A Novel Q Measurement Method" which is herein incorporated by reference in its entirety.

TECHNICAL FIELD

Embodiments of the present invention are related to wireless power systems and, specifically, to a method of Quality Factor (Q-Factor) Determination.

DISCUSSION OF RELATED ART

Typically, a wireless power system includes a transmitter coil that is driven to produce a time-varying magnetic field and a receiver coil that is positioned relative to the transmitter coil to receive the power transmitted in the time-varying magnetic field. One measure of the efficiency of the system is to measure the Quality Factor (Q-Factor) of the resonant circuit that includes the transmitter coil. In general, the Q-Factor can be defined in a resonant circuit as a dimensionless figure-of-merit related to the ratio of the energy stored in the circuit over the amount of energy dissipated from the circuit per cycle. The resonant circuit in the transmitter typically includes the transmit coil coupled in series with a capacitance, the series circuit coupled across the driving voltage.

There are multiple reasons to determine the Q-Factor of a resonant circuit in wireless power system. The resonant circuit is affected by the receiver system and foreign objects in the field of the generated electromagnetic field. Consequently, monitoring the Q-Factor of the transmitter resonant circuit can be used as an indication of foreign objects. Further, monitoring the Q-Factor can help with operation because, as it is a function of resonant frequency, the Q-Factor can help determine the resonant frequency. Further, the Q-Factor can be used to facilitate communications methods.

In an important aspect, the Q-factor can be used to determine the presence of a foreign object (FO). As the power of the transferred wireless power becomes higher, safety becomes an increasingly important factor. A FO object in the presence of the time-varying magnetic field may be heated to a dangerous level. Measuring the Q-factor allows for a determination of the presence of a FO prior to entering a power transfer phase.

Current methods of measuring the Q-Factor in a wireless power transmitter can be complex. Consequently, there is a need for better determination of the Q-factor in a wireless system.

SUMMARY

In accordance with some embodiments of the present invention, a wireless transmitter with a Q-factor measurement is presented. A wireless power transmitter according to some embodiments includes a transmit coil coupled between a first node and a second node; a half-bridge circuit coupled between an input voltage and a ground, the half-bridge circuit coupled to the first node; a capacitor circuit having a plurality of capacitors coupled to the transmit coil; a measurement circuit coupled to the capacitance circuit and to the transmit coil; and a transmit driver coupled to the measurement circuit and the half-bridge circuit, wherein during a measurement test, the transmit driver configures the half bridge circuit to form an LC oscillating circuit with the transmit coil and the capacitor circuit, monitors a sinusoidal voltage in the LC oscillating circuit, and determines a result from the sinusoidal. The result can be calculation of a Q-factor and/or determination of presence of a foreign object.

In some embodiments, a method of performing a measurement test in a wireless power transmitter includes adjusting an input voltage to a bridge circuit; setting up transistors in the wireless power transmitter to form an LC oscillating circuit that includes a transmit coil and a capacitor circuit; measuring a VDET sinusoidal voltage from the LC oscillating circuit; and determining a result from the VDET sinusoidal voltage.

These and other embodiments are further discussed below with respect to the following figures.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 1A:
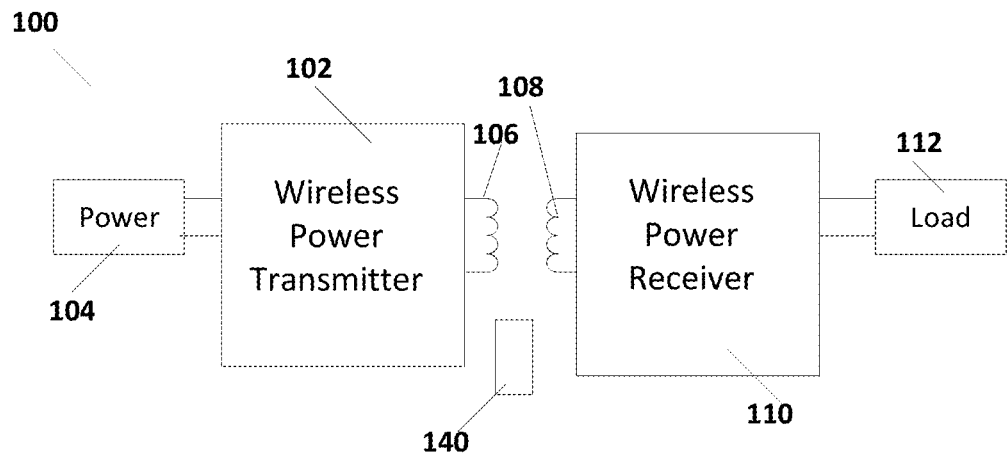
FIG. 1A illustrates a wireless power transmission system.

FIG. 1A illustrates a system 100 for wireless transfer of power. As illustrated in FIG. 1A, a wireless power transmitter 102 drives a coil 106 to produce a magnetic field. A power supply 104 provides power to wireless power transmitter 102. Power supply 104 can be, for example, a battery-based supply or may be powered by an alternating current for example a 240V at 50 Hz standard supply. Wireless power transmitter 102 drives coil 106 at, typically, a range of frequencies, typically according to one of the wireless power standards. However, this could be applicable to any frequency where it is practical to transfer power and/or information by means of magnetic coils irrespective of any standard that may exist.

There are multiple standards for wireless transmission of power, including the Alliance for Wireless Power (A4WP) standard and the Wireless Power Consortium standard, the Qi Standard. Under the A4WP standard, for example, up to 50 watts of power can be inductively transmitted to multiple charging devices in the vicinity of coil 106 at a power transmission frequency of around 6.78 MHz. Under the Wireless Power Consortium (WPC), the Qi specification, a resonant inductive coupling system is utilized to charge a single device at the resonance frequency of the device. In the Qi standard, coil 108 is placed in close proximity with coil 106 while in the A4WP standard, coil 108 is placed near coil 106 along with other coils that belong to other charging devices. FIG. 1A depicts a generalized wireless power system 100 that operates under any of these standards. In Europe, the switching frequency has been limited to 148 kHz.

As is further illustrated in FIG. 1A, the magnetic field produced by coil 106 induces a current in coil 108, which results in power being received in a receiver 110. Receiver 110 receives the power from coil 108 and provides power to a load 112, which may be a battery charger and/or other components of a mobile device. Receiver 110 typically includes rectification to convert the received AC power to DC power for load 112.

Figure 1B:
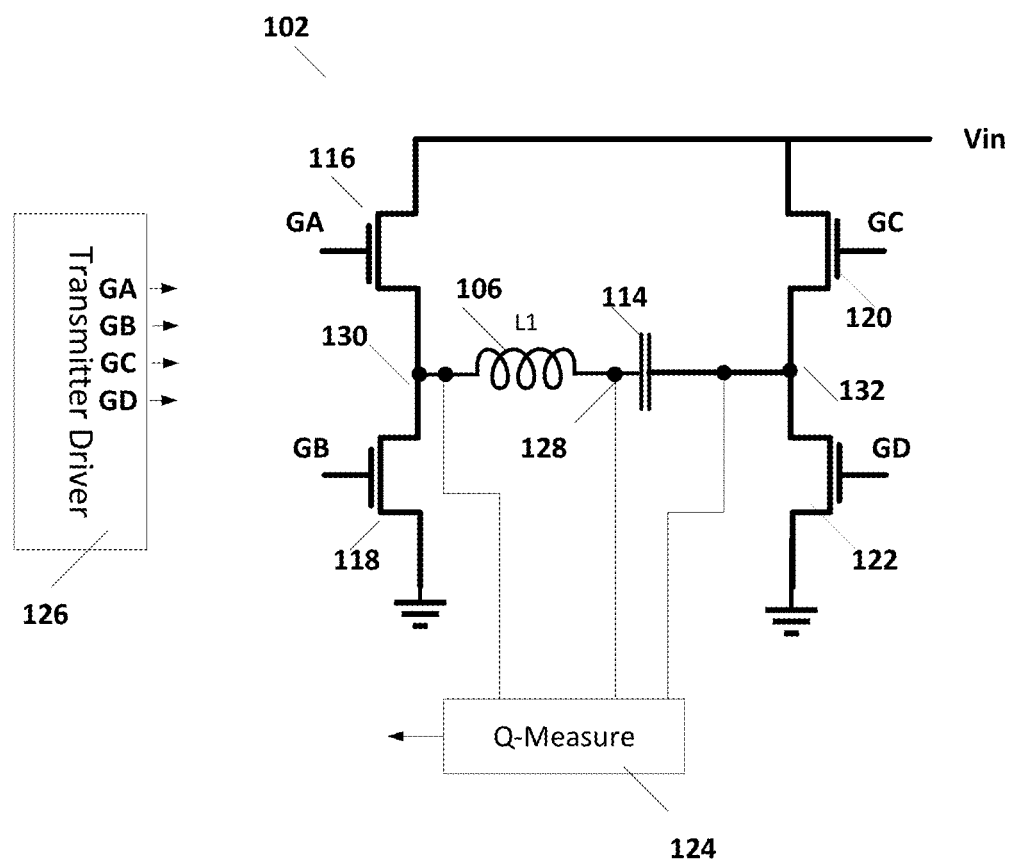
FIG. 1B illustrates determination of a Q-factor.

FIG. 1B depicts wireless power transmitter 102 in further detail. In many situations, transmit coil 106 is coupled in series with a capacitor 114 across a full-bridge driver formed by transistors 116, 118, 120, and 122. As illustrated in FIG. 1B, transistors 116 and 118 are coupled in series between an input voltage $V_{in}$ and ground. Transistors 120 and 122 are also coupled in series between input voltage $V_{in}$ and ground. Transmit coil 106 is coupled between node 130 between transistors 116 and 118 and node 132 between transistors 120 and 122. The current through transmit coil can be driven by alternately turning on transistors 116 and 122 while transistors 120 and 118 are off and turning on transistors 120 and 118 while transistors 116 and 122 are off. In some embodiments, transmit coil can be driven in a half-bridge fashion by leaving transistor 120 off, transistor 122 on, and alternately turning on transistors 116 and 118.

Although FIG. 1B illustrates a wireless power transmitter 102 with a simple resonant circuit having series coupled transmit coil 106 and capacitor 114, other more complex transmit coil technologies may be used. In some cases, a multi-coil transmit coil such as, for example, an A13 coil topology may be used. However, for purposes of simplification, the resonant circuit illustrated in FIG. 1B is instructive.

Transistors 116, 118, 120, and 122 are driven by a transmitter driver 126. Transmitter driver 126 can be a single integrated circuit that generates gate voltages GA, GB, GC, and GD to driver transistors 116, 118, 120, and 122, respectively. As is shown in FIG. 1B, a measurement circuit 124 can be coupled to receive signals from a node 128 between transmit coil 106 and capacitance 114 as well as signals from nodes 130 and 132. In some embodiments, measurement circuit 124 can provide signals to transmit driver 126, which itself can determine the Q-factor. Driver 126 can drive transmit coil 106 at a particular frequency, for example a resonant frequency as determined by modifying the driving frequency to maximize the Q-factor. Further, measurement circuit 124 can provide signals to transmitter driver 126 to control the states of transistors 116, 118, 120, and 122 during the texting.

The Q-factor can be determined as the ratio of the voltage across transmit coil 106 and the input voltage $V_{in}$. In some embodiments, the Q-factor can be determined by approximately measuring the amplitude of the AC signal across transmit coil 106, i.e. between nodes 130 and 128, which can be used to detect the presence of a foreign object. In some example, transmit driver 126 can monitor the Q-factor to detect the presence of a foreign object.

Transmitter driver 126 can include a microcontroller, microprocessor, field programmable gate arrays (FPGAs), application specific integrated circuits (ASICs) and/or the like. Transmitter driver 126 further includes sufficient memory, both volatile and non-volatile, to hold data and firmware instructions to perform the tasks described in this disclosure. Transmitter driver 126 further includes interface and other circuitry to allow communications of data, power, and other signals.

The Q-factor can be important to foreign object (FO) detection (FOD) in wireless power systems. In many applications, for example automotive applications, FOD detection becomes an important aspect of wireless power transmission. The presence of a foreign object such as foreign object 140 illustrated in FIG. 1A causes multiple problems, including degradation of the Q-factor representing lack of efficiency of wireless power transfer. Further, foreign object 140 may be heated during the wireless power transfer, causing a risk of fire or other damage.

Measurement of the Q-factor can use several techniques, including a frequency sweeping method and a ringing decay method. The ringing decay method is the subject of a previously filed application, U.S. application Ser. No. 15/998,784, which is herein incorporated by reference in its entirety. However, each of these methods has drawbacks, as is discussed further below. Embodiments of the present invention overcome many of these drawbacks.

Figure 2:
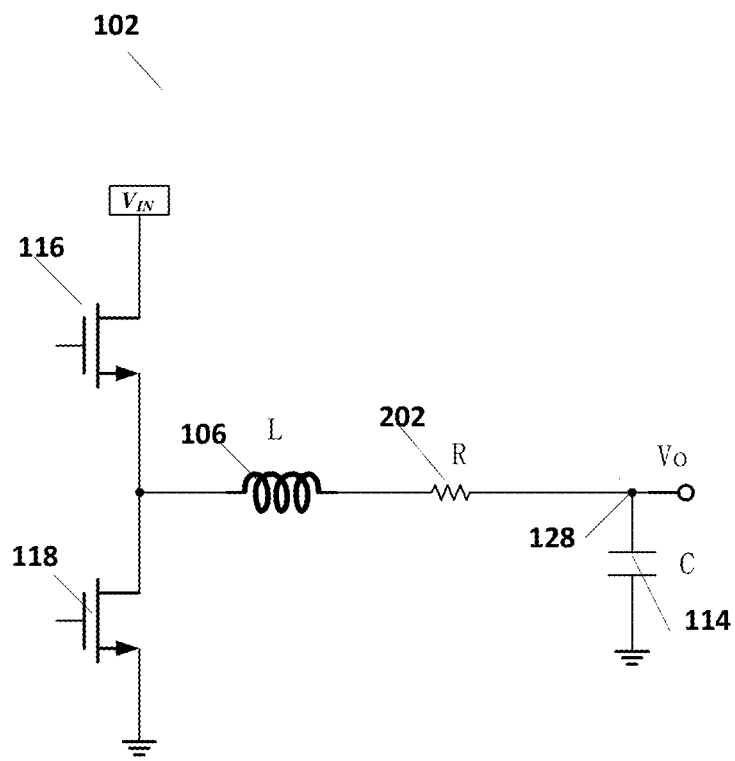
FIG. 2 illustrates a transmitter circuit configured for measuring a Q factor with traditional Q-factor measurement methods.

FIG. 2 illustrates another depiction of transmitter 102 as illustrated in FIG. 1B. In particular, FIG. 2 illustrates a configuration that includes transistors 116 and 118 driving the series coupled transmit coil 106 and capacitance 114 according to transmit driver 126. In some cases, where wireless power transmitter 102 uses a half-bridge driving arrangement, transistor 122 can be substituted with a connection from capacitor 114 to ground and transistor 120 may be absent. In some cases, the configuration is formed by turning transistor 122 on and transistor 120 off. Further, FIG. 2A illustrates the resistance 202, which may be the resistance of transmit coil 106. Measurement according to the frequency sweep method or the ringing decay method measure the Q-factor by measuring voltage V0 at node 128 between transmitter coil 106 and capacitor 114.

Figure 3A:
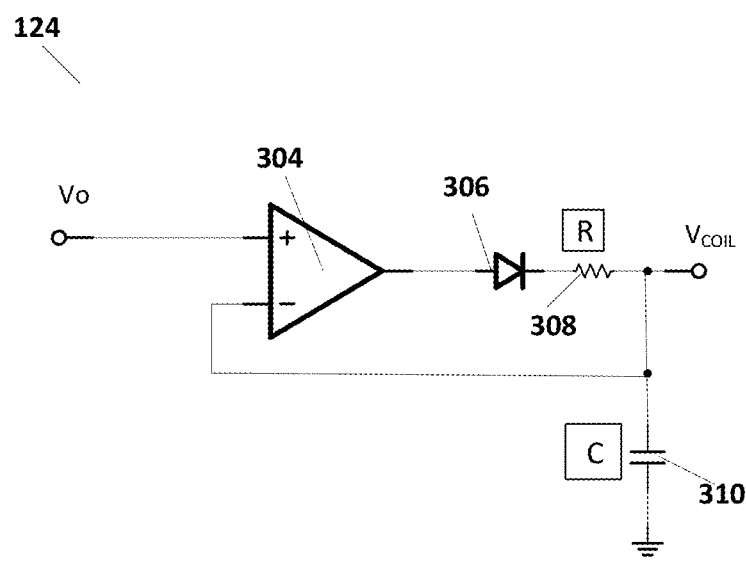
FIGS. 3A and 3B illustrate a Q-factor determination by frequency sweeping.
Figure 3B:
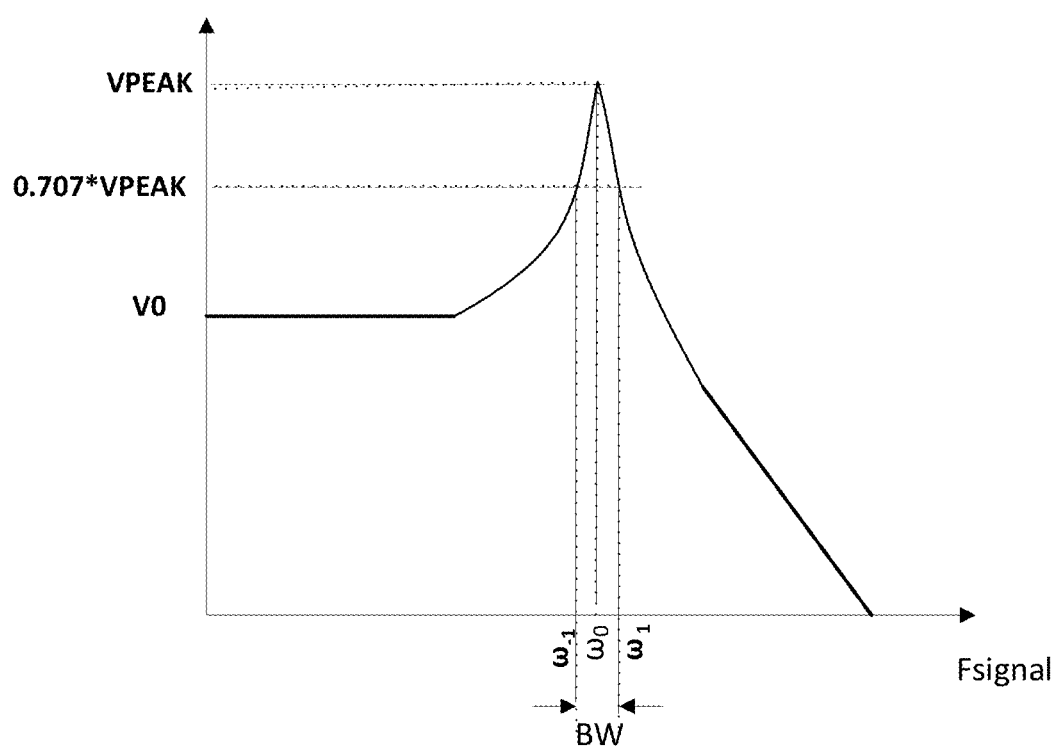

FIGS. 3A and 3B illustrate measurement of the Q-factor in the arrangement illustrated in FIG. 2. During the measurement transistors 116 and 118 generate pulses at frequencies that vary across a range of frequencies. For example, the frequency can be varied in a range around 100 kHz. As illustrated in FIG. 1B, a measurement circuit 124 measures the voltage across inductor 106, which is the voltage $V_0$ at node 128.

FIG. 3A illustrates measurement circuit 124 appropriate for measuring the voltage $V_0$ at node 128 during a frequency sweep over the range of frequencies discussed above. As illustrated in FIG. 3A, the voltage $V_0$ at node 128 is input to a differential amplifier 304 followed by a diode 306. The signal is then filtered with resistor 308 and capacitor 310 to provide an output voltage $V_{coil}$. In some embodiments, the frequency sweep can be performed by stepping operation of transistors 116 and 118 through the frequency range making measurements at each step frequency during the process. The frequency sweep can be controlled by transmitter driver 126. The data produced by measurement circuit 124 can be input to transmit driver 126, which processes the data to determine the quality factor Q.

FIG. 3B illustrates the output voltage $V_{coil}$ from measuring circuit 124 as a function of frequency. As illustrated, the maximum Q-factor is illustrated at the peak $V_{peak}$, which occurs at frequency $\omega_0$. A bandwidth BW can be defined by the width of the curve at the 3 dB attenuation point. The 3 dB attenuation points, $0.707*V_{peak}$, occur at frequencies $\omega_{-1}$ and $\omega_1$. Consequently, as shown in FIG. 2C, BW=$\omega_1-\omega_{-1}$=2*($\omega_1-\omega_0$). In one calculation, the quality factor Q can then be given by Q=$\omega_0$/BW. Alternatively, the quality factor Q can also be calculated from the low frequency (i.e. DC) voltage $V_0$, Q=$V_{peak}/V_0$.

The technique for determining Q has several merits. First, measuring circuit 124 is easy to design. The filter formed by resistor 208, resistance R, and capacitor 210, capacitance C, is relatively easy to design. However, in practical applications it is exceedingly difficult to locate the peak voltage $V_{peak}$. A small difference in $V_{peak}$ and $\omega_0$ results in large differences in Gain and therefore a large difference in the calculation of the Q-factor Q. Further, it typically takes a long time to take the data to calculation the Q-factor Q.

Further, the measurement according to the frequency sweeping technique depends on the stability of the input voltage $V_{in}$ during the measurement. Instability of the input voltage $V_{in}$ can result in large errors in the resulting calculation of the Q-factor.

Further, when the frequency is at or near $\omega_0$, the current through transistors 116 and 118 can be high, which can result in large input ripple to measurement circuit 124 leading to large measurement errors. Further, the large current requires a good bridge supply source. Usually, the input voltage $V_{in}$ is reduced to reduce the current. However, the small input voltage $V_{in}$ also brings higher error in the results. Additionally, the pulses used during the technique may contain many harmonics, which also affect the result accuracy.

Furthermore, in order to mitigate at least some of these problems, the firmware design for processing the data, which may occur in transmitter driver 126, becomes very complex. Further, since operation may occur with BW>20 MHz, the cost of circuitry for processing becomes higher. All of these issues result in instability of the measurement, even if performed on the same board. Distribution of the circuitry across several boards increases the instability.

The ringing decay method includes charging capacitor 114 in the LC tank circuit illustrated in FIG. 2 (resonant circuit) that includes series coupled transmit coil 106 and capacitor 114 to a charging voltage and starting the resonant circuit in a free-oscillation is provided. The voltage across capacitor 128 can be measured in the free-oscillation and the resonant frequency and the Q-factor can be determined from that data. There is no need for a frequency sweep or for a large database to be obtained. The data can be obtained faster than the frequency sweeping method and the analysis can be accomplished more accurately and quicker than that provided by the frequency sweep technique.

Figure 4A:
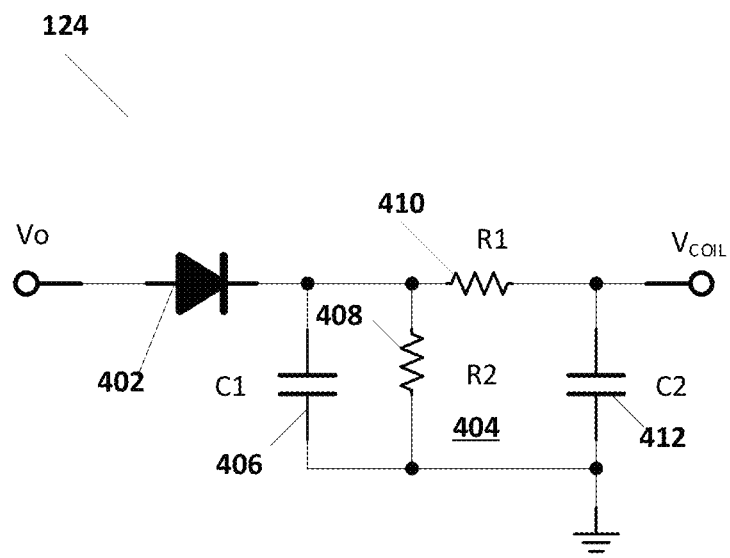
FIGS. 4A and 4B illustrate a Q-factor determination by ringing decay.
Figure 4B:
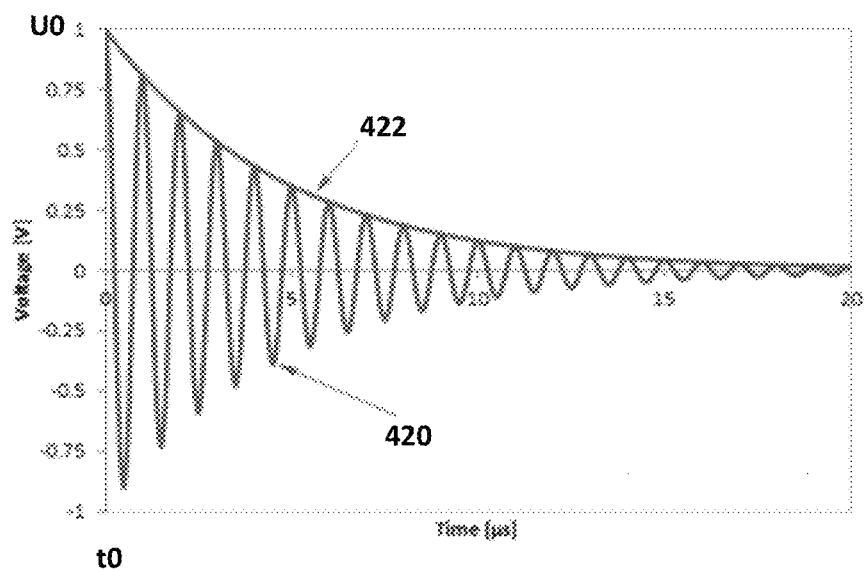

FIGS. 4A and 4B illustrates determining the Q-factor by ringing decay. FIG. 4A illustrates a measuring circuit 124 appropriate for measuring the ringing decay. The output from measuring circuit 124, for example, can be input to transmit driver 126, which processes the data to determine the Q-factor. As discussed above, the process starts with transmitter driver 126 turning transistor 116 on and transistor 118 off to charge capacitor 114. At time t=0, transistor 116 is turned off, transistor 118 is turned on, and the LC tank is allowed to oscillate. Data from measuring circuit 124 is processed.

As shown in FIG. 4A, a measuring circuit 124 receives the voltage V(t) at node 128 into a diode 402. A filter 404 that includes capacitors 406 and 412 and resistors 408 and 410 is then provided. The output $V_{coil}$(t) is the time varying voltage resulting from the oscillating voltage from the LC circuit formed by transmit coil 106 and capacitor 114.

FIG. 4B illustrates the voltage $V_{coil}$(t) while the LC circuit formed by transmit coil 106 and capacitor 114. At time t=0, the voltage $V_{coil}$(t) can be designated as $U_0$. The time-varying waveform 420 is generally modeled as a linear homogeneous differential equation of order, which generally has the solution $$V_{coil}(t) = U_0 e^{-\frac{\omega}{2Q}t} \cos\left(\omega t \sqrt{1 - \frac{1}{4Q^2}} + \varphi\right),$$

where $U_0$ is the voltage at time t=$t_0$ $V_{coil}(t_0)$, $\varphi$ is a phase constants during the free-oscillation, $\omega$ is the resonant frequency $2\pi f_0$, Q is the quality factor of the resonant circuit, and t is time. In most cases, Q is large enough that the value of $V_{coil}$(t) becomes $$V_{cp}(t) = U_0 e^{-\frac{\omega}{2Q}t} \cos(\omega t + \varphi).$$

Consequently, the resonant frequency $f_0$ can be determined directly from the time between successive oscillations of the exponentially decaying cosine function of waveform 422.

As is further illustrated in FIG. 4B, the amplitude envelope 422, $V_{env}$(t), is an exponential decay which, as discussed above, is given by $$V_{env}(t) = U_0 e^{-\frac{\omega}{2Q}t}.$$

Consequently, since the resonant frequency $f_0$ is known, and therefore the frequency $\omega$ is known, the Q-factor Q can be determined from the exponential decay curve (or envelope curve) 420. In particular, one method of determining Q is to pick a time $t_1$ after the time $t_0$, determine the value of the envelope at time $t_1$, $V_{env}(t_1)$, and determine the value of Q, which from the above equation for $V_{env}$(t) is given by $$Q = \frac{\omega_0(t_1 - t_0)}{2 * \ln\left(\frac{U_0}{V_{env}(t_1)}\right)}.$$

Consequently, the Q-factor can start by measuring the initial voltage while capacitor 114 is fully charged at time $t_0$, which is the time at which the LC circuit begins to oscillate. A second measurement of the envelope voltage is then taken at a time $t_1$ following time $t_0$. The Q-factor can then be calculated as described above.

The ringing decay method results in a more stable measurement. The measurement is performed in a short time (for example about 1 ms). The measurement is not dependent on the input voltage $V_{in}$, therefore the stability of the input voltage $V_{in}$ or high currents that may be a problem in the frequency sweep measurement is not a problem. Further, measuring circuit 124 is relatively simple and low cost. The firmware executed in transmit driver 126 can be relatively simple. The components can be distributed among different boards with acceptable performance. The method is not temperature sensitive. The circuits can also be used in a frequency sweeping method, so multiple measurement techniques may be implemented.

However, the ringing decay method also has some drawbacks. Among them are that the RC filter 404 has to be carefully tuned. There is a trade-off between accurate measurement on big foreign objects (FOs) and stable reads. If the RC constant of filter 404 is great, the result is very stable. However, the quality factor Q with a big FO will be greater. Fortunately, filter 404 can be designed such that it simultaneously guarantees stable reads and accuracy with small FOs. Further, if the printed circuit boards (PCBs) that include the wireless transmitter are poorly laid out, Q may be small and the difference between a receiver and a small FO may also be small, which makes them difficult to distinguish. Additionally, as discussed above, although the firmware may be relatively simple, the calculation itself is complicated and may be difficult to accurately implement in transmitter driver 126.

Furthermore, although the ringing decay method is very applicable to a system as shown in FIG. 2 with a single transmission coil, the system works much less well with a system that uses the MP-A13 coil topology. The MP-A13 topology utilizes a 3-coil array package commonly used in wireless power systems to provide for the transmission coil. The MP-A13 coil topology introduces a high frequency ringing resulting from two additional inductors (e.g., inductors) and capacitors (e.g. 400 nF of capacitance). The high frequency ringing introduces testing error that can affect calculation of the Q-Factor in that configuration.

Figure 5A:
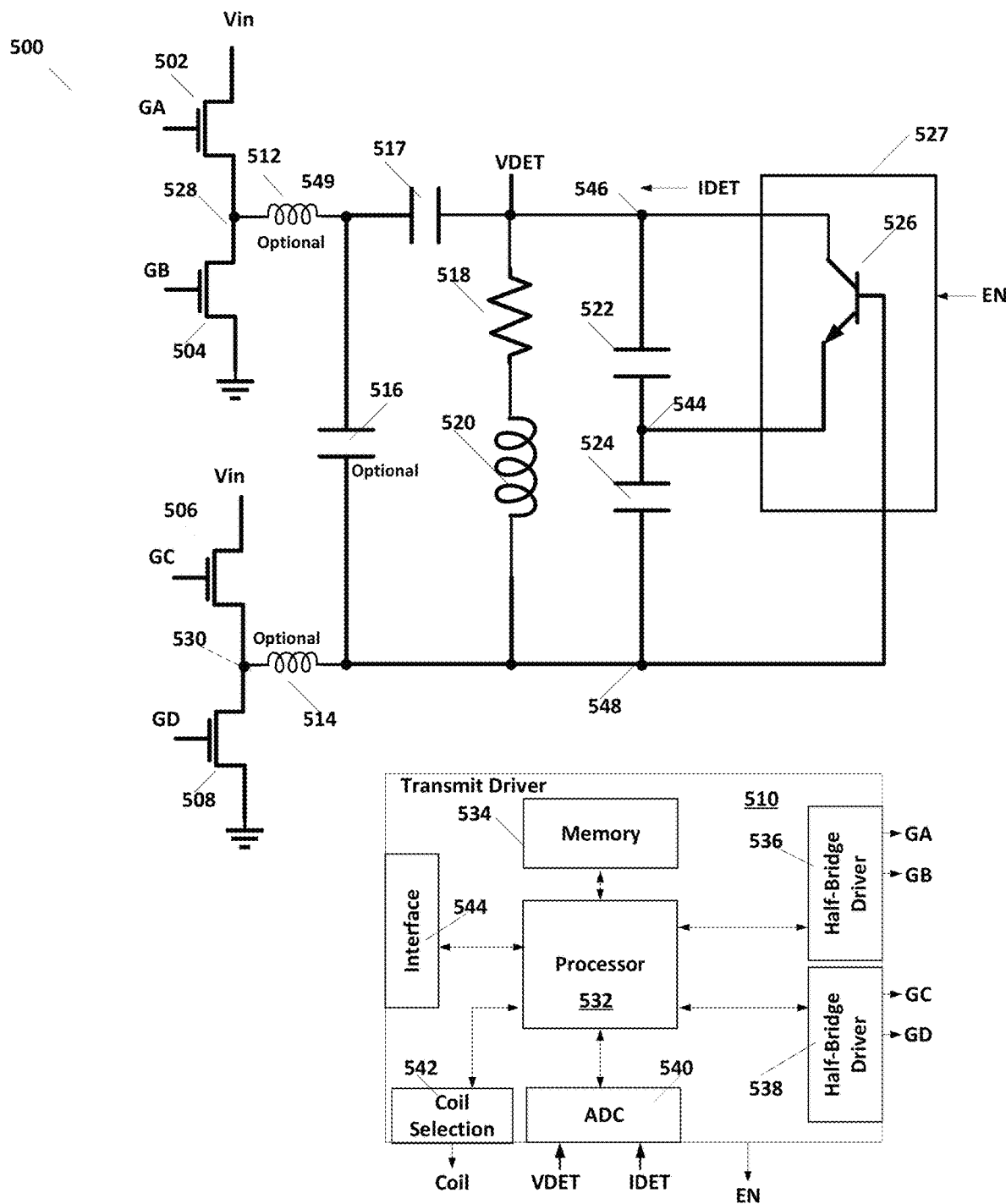
FIGS. 5A, 5B, and 5C illustrate measurement of the Q-factor in a transmitter according to some embodiments.

FIG. 5A illustrates an example implementation of a wireless power transmitter 500 with a Q-factor measurement according to some embodiments. As illustrated in FIG. 5A, transmitter 500 includes a full-bridge driver formed with transistors 502, 504, 506, and 508. As is illustrated, transistors 502 and 504 are coupled in series between an input voltage $V_{in}$ and ground. Transistors 506 and 508 are also coupled in series between input voltage $V_{in}$ and ground. The gates of transistors 502, 504, 506, and 508 (GA, GB, GC, and GD, respectively) are driven by a transmitter driver 510.

Node 528 between transistor 502 and transistor 528 is coupled to an inductor 512 while node 530 between transistors 506 and 508 is coupled to an inductor 514. A capacitance 516 is coupled between inductors 512 and 514 opposite nodes 528 and 530. Inductors 512 and 514 as well as capacitor 516 are optional and dependent on the particular coil configuration used for wireless power transmit coil 520. The example configuration illustrated in FIG. 5A is particularly useful for the MP-A13 coil topology. Other coil topologies can be used.

Transmission coil 520, in series with resistor 518, is coupled across capacitor 516 (i.e. coupled between nodes 528 and 530). Further, a capacitor 517 may be coupled between node 528 and transmission coil 520. As discussed above, in examples where transmit coil 520 is an MP-A13 coil topology, inductors 512 and 514 are 1 µH inductors while capacitance 516 is 400 nF of capacitance. In the embodiment illustrated in FIG. 5A, series coupled capacitors 522 and 524 are also coupled across capacitor 516. Capacitors 522 and 524 form a capacitive divider, which may be removed if capacitors 516 and 517 are present. For example, node 544 may be moved to node 549 between capacitors 516 and 517 when capacitors 522 and 524 are absent.

In the example illustrated in FIG. 5A, transmitter driver 510 can be formed on an integrated circuit and coupled to drive the gates of transistors 502, 504, 506, and 508. Transmitter driver 510 can include a processor 532 coupled to memory 534. Processor 532 can be any microcontroller, microprocessor, or other processing device capable of performing the functions associated with controlling the wireless power transmitted by wireless power transmitter and performing the function described here. As a particular example, transmitter driver may be a P9261 wireless power transmitter chip sold by Renesas, where processor 532 is a 32-bit ARM processor. Memory 534 can be a combination of volatile and non-volatile memory structures for storage of data and firmware programming instructions for processor 534. Processor 534 executes instructions stored in memory 534 to control the operation of the wireless power transmitter 500. In some embodiments, processor circuit 532 can be coupled by an interface circuit 544 to interface pins on the integrated circuit, by which firmware stored in memory 534 can be loaded or updated or other communications may be performed with transmit driver 510.

As is further illustrated in FIG. 5A, processor 523 is coupled to half bridge drivers 536 and 538, which may be PWM generators to provide gate signals GA, GB, GC, and GD to transistors 502, 504, 506, and 508, respectively. In some embodiments, half bridge drivers 536 and 538 can be operated such that transistors 502 and 504 are driven in half-bridge mode and transistors 506 and 508 are set to keep transistor 508 on and transistor 506 off such that node 530 is set to ground.

Transmit driver 510 may further be capable of interfacing with a multi-coil configuration, such as the MP-A13 coil topology discussed above. Therefore, processor 532 may be coupled to a coil selection driver 542 to select a particular coil configuration of the coil topology. In FIG. 5A, transmit coil 520 may include the multi-coil transmit top0ology and switches coupled to receive signals from coil selection driver 542 to choose a particular configuration.

Transmit driver 510 further includes analog-to-digital converters 540 that can receive input signals and provide corresponding digitized signals to processor 532. ADC 540 may include multiplexers and ADCs for receiving and processing analog signals. In FIG. 5A, ADC 540 may receive a voltage signal VDET and a current signal IDET, as is further discussed below.

In accordance with embodiments of this disclosure, a measurement circuit 527 that includes a bipolar junction (BJT) 526, which is shown as an NPN BJT for simplification, is illustrated. In practice, BJT 526 may be implemented as an operational amplifier. As shown in FIG. 5A, BJT 526 has base coupled to node 548 that is grounded through inductor 514 to grounded node 530, emitter coupled to junction 544 between capacitor 522 and capacitor 524 (or in the absence of capacitors 522 and 524 to node 549), and collector coupled to node 546 on the opposite side of capacitor 522 from node 544. The Q-factor is then a function of the current $I_{DET}$ at node 546 and the voltage $V_{DET}$ at node 546. The Q-factor can be given by $$Q_L = \frac{V_{DET}}{I_{DET}} * \frac{\omega * C}{2}$$

where ω is the frequency of the signal generated by the Q-measuring circuit formed by BJT 526 and C is the capacitance contributed by the capacitor divider (capacitors 522 and 524) and the resonant caps 516 (if present) and 517. To simply measurements, an operational amplifier may be used in place of BJT 526. In that case, $I_{DET}$ reaches a limit which is known and therefore QE can be determined with measurement of $V_{DET}$ alone. The values of VDET and IDET are the amplitudes of the base frequency component signal.

Figure 5B:
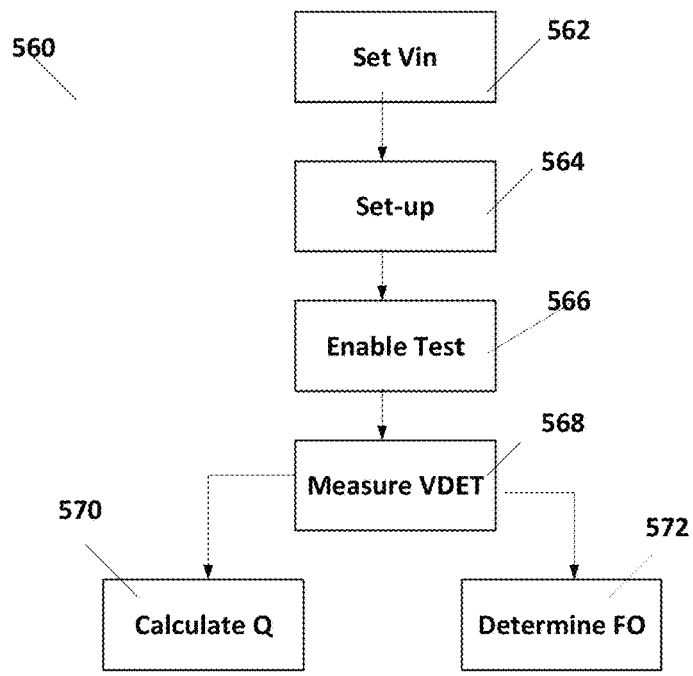

FIG. 5B illustrates operation of transmitter 500 to provide a measurement 560 according to some embodiments. As one of ordinary skill will recognize, measurement 560 may be modified for particular configurations of transmitter 500 tailored for particular coil configurations. However, measurement 560, or measurement 560 with modifications, can be used for measurement according to some embodiments of the present disclosure.

Measurement 560 starts with step 562. In step 562, Vin is set at a level so that the body diodes of transistors 502, 504, 506, and 508 do not conduct. In some systems, Vin can be set to 5V or higher. In set-up step 564, transistors 502, 504, 506, and 508 are set to perform the measurement. In some embodiments, other transistors may be fixed as well. In the example illustrated in FIG. 5A, transistors 502, 504, and 506 are set to off and transistor 508 is turned on. In some embodiments, bridge transistors 502, 504, 506, and 508 are set otherwise. For example, in some embodiments transistor 508 may remain off as well. In step 566, measurement circuit 527 is enabled, which engages BJT 526 as illustrated. In the configuration as illustrated in FIG. 5A, with transistors 502, 504, and 506 off, transistor 508 on, and measurement circuit 527 enabled, an LC oscillator is formed with transmit coil 520 and the capacitances formed by capacitors 522, 524, 516, and 517 as discussed above.

In step 568, while the LC circuit is oscillating, the value of VDET is measured. The VDET amplitude of the sinusoidal signal generated in the LC circuit is very sensitive to the presence of a foreign object. Consequently, in some embodiments method 560 proceeds to step 572 where the presence of a foreign object is directly determined by the VDET amplitude measurement and other characteristics of the sinusoidal signal produced. In some embodiments, method 560 proceeds to step 570 for a precise calculation of the Q-value for later use. The calculated Q-value can also be used to determine the presence of a foreign object, or may be used for other purposes in wireless power transmitter 500.

Figure 5C:
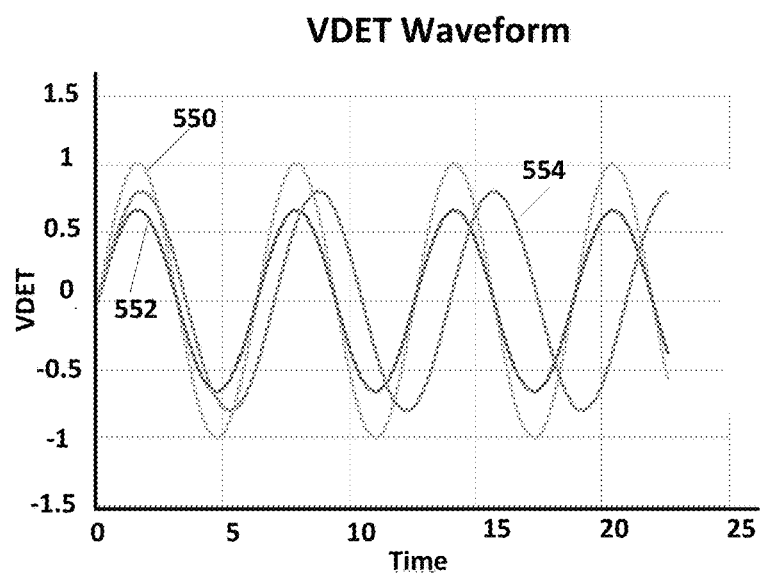

FIG. 5C illustrates VDET sinusoidal waveforms under particular conditions. Waveform 550 illustrates the VDET waveform in transmitter 500 with no foreign object (FO) and no receiver circuit proximate to transmit coil 520. VDET waveform 552 illustrates the VDET waveform in transmitter 500 with a FO proximate to transmit coil 520. VDET waveform 554 illustrates the VDET waveform in transmitter 500 with a receiver proximate to transmit coil 520. As illustrated in FIG. 5B, the VDET waveforms are sinusoidal waveforms with a particular frequency ω. In particular, comparing waveform 550 (no receiver or FO) with waveform 552 (FO), the frequency ω stays the same but waveform 552 is reduced in amplitude from waveform 550. Comparing waveform 550 with waveform 554 (receiver), the frequency of waveform 554 is shifted and the amplitude of waveform 554 is reduced. As illustrated in FIG. 5B, stable results are illustrated where the presence of a FO and a receiver can be detected.

Consequently, the VDET sinusoidal waveforms can be analyzed in transmit driver 510 to determine the Q-factor or determination of presence of a foreign object. In particular, shifts of the VDET sinusoidal waveform (i.e. measurements of the VDET amplitude and/or the frequency ω) can be used to determine presence of the foreign object.

Figures 1, 6:
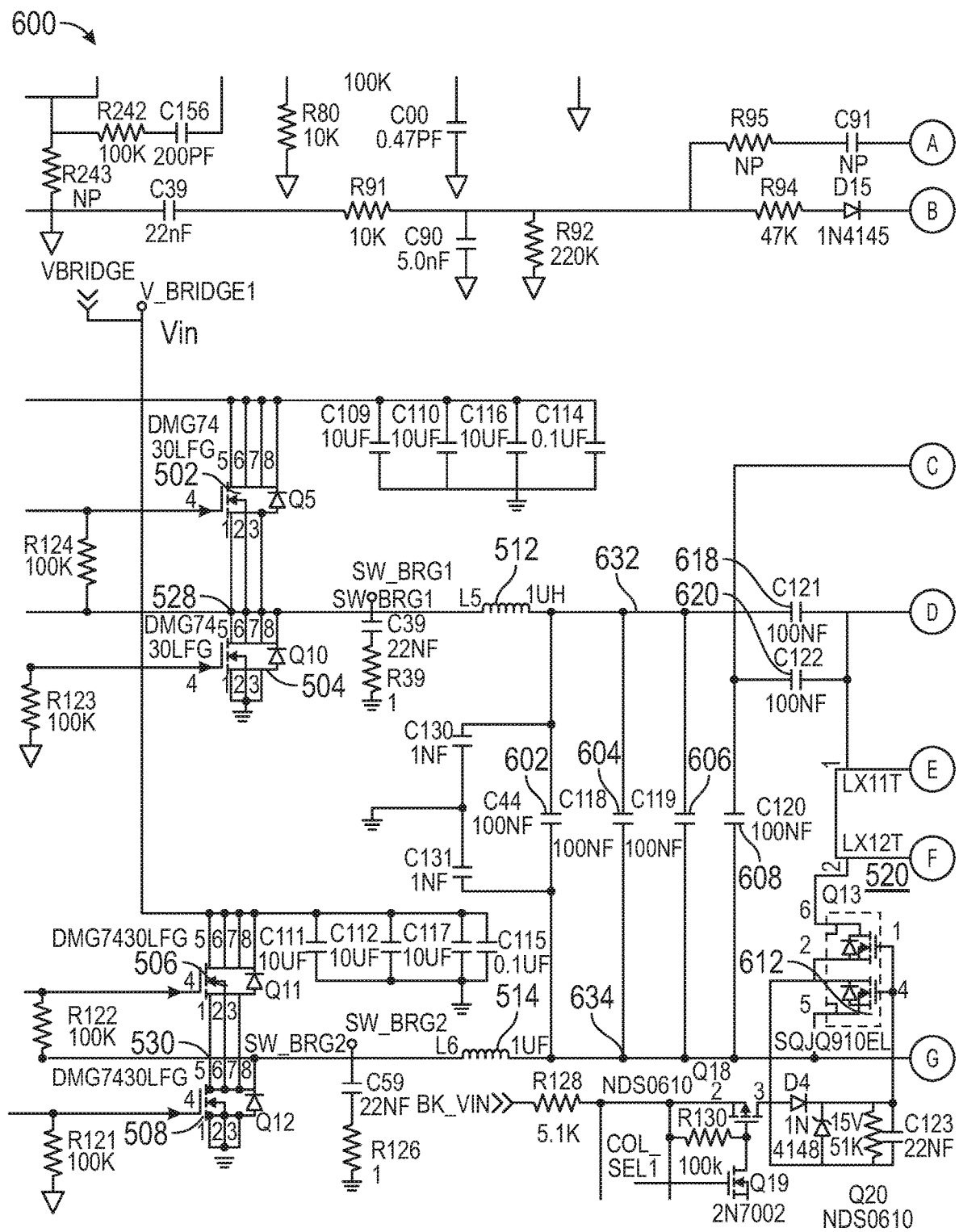
FIG. 6 (including FIGS. 6-1, 6-2, and 6-3) illustrates an embodiment of the measurement as illustrated in FIGS. 5A, 5B, and 5C.
Figures 2, 6:
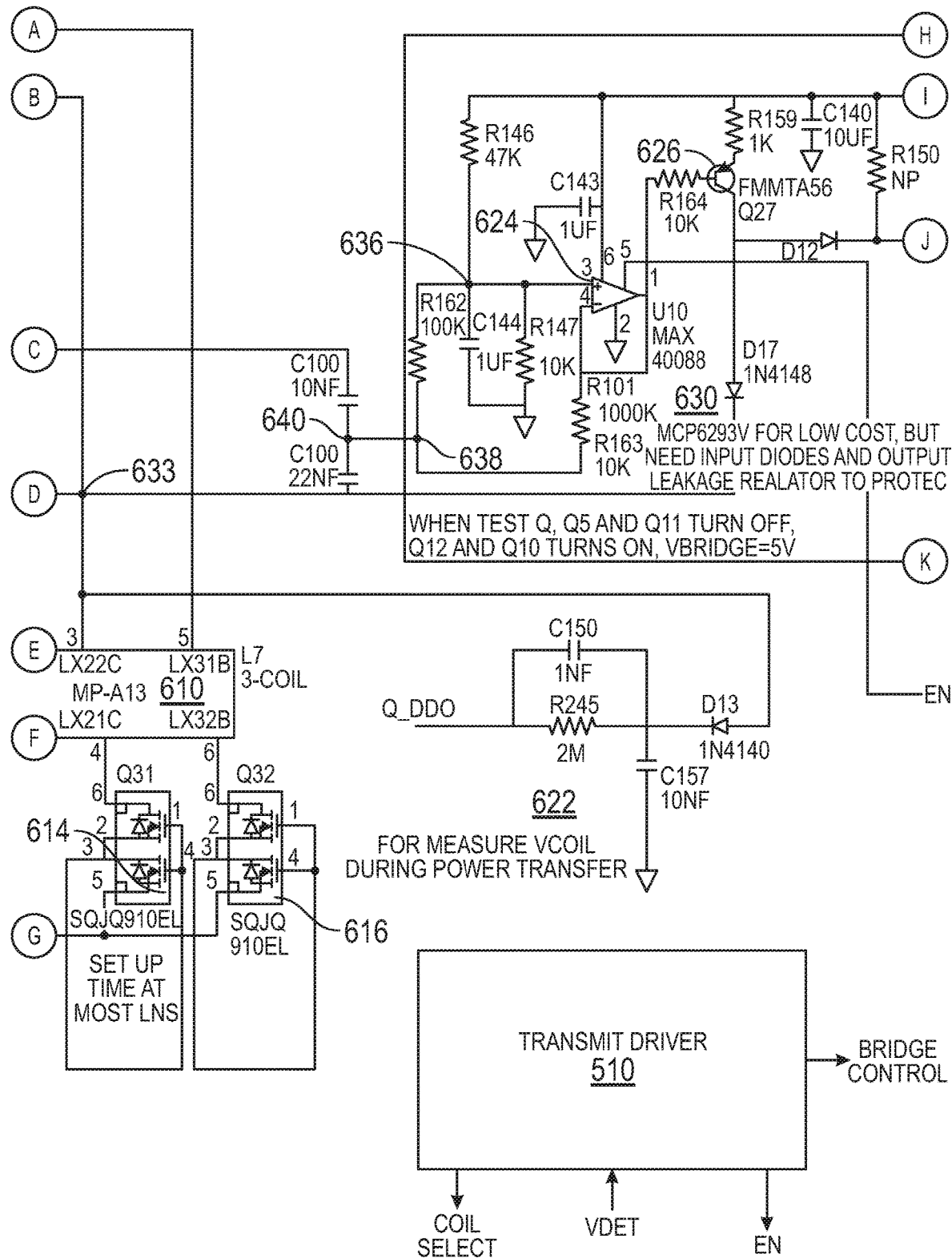
Figures 3, 6:
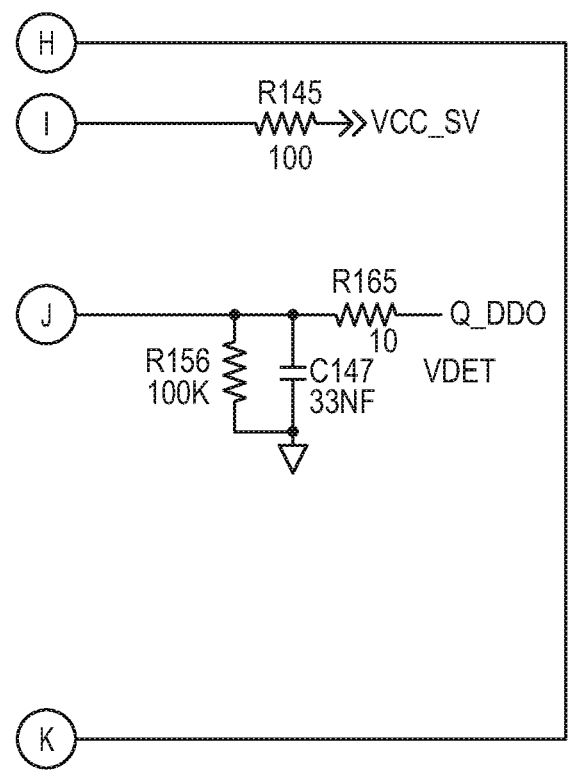

FIG. 6 (including FIGS. 6-1, 6-2, and 6-3) illustrates an embodiment of a measuring system in a wireless transmitter 600. In wireless transmitter 600, capacitor 516 includes four parallel capacitors 602, 604, 606, and 608. Transmit coil 520 is illustrated by MP-A13 coil configuration 610 coupled to switches 612, 614, 616. Transmit driver 510 drives coil selection 542 to drive a particular coil configuration as directed by processor 532. Capacitors 618 and 620 are coupled in parallel between MP-A13 coil configuration 610 and inductor 512. Transmitter 600 further includes a Vcoil measurement circuit 622. As is further illustrated in FIG. 6 (including FIGS. 6-1, 6-2, and 6-3), the coil select signal from transmit driver 510 controls the operation of switches 612, 614, and 616. Transmit driver 510 as illustrated in FIG. 6 (including FIGS. 6-1, 6-2, and 6-3) inputs the VDET signal measured by detector circuit 630.

Detector circuit 630 includes operational amplifier 624 and BJT 626 configured to generate the VDET voltage from node 633. As illustrated, amplifier 624 receives a voltage divided signal at node 636 and a voltage divided signal between the output signal from amplifier 624 and the voltage at node 638. The voltage at node 636 is a resistive divided signal between Vin and node 638. Node 638 is a capacitive divided signal from capacitive divider 640 coupled between transmit coils 610 and node 633. BJT 626, which in this example is a PNP junction 626 with emitter coupled to the input voltage Vin, the collector coupled to transmit col 610, and base coupled to the output from amplifier 624. As a consequence, the voltage at node 636 provide a low noise DC reference for operational amplifier 624 and BJT 626 to stay in proper bias. The collector of BJT 626 thereby provides the VDET sinusoidal signal that can be analyzed by transmit driver 510 as discussed above. During the measurement test for the system illustrated in FIG. 6 (including FIGS. 6-1, 6-2, and 6-3), during step 564, transistors 502 and 506 are turned off and transistors 504 and 508 are set (e.g., either turned on or off). This arranges for an LC oscillator with transmit coils 610 and capacitors 618 and 620 and optionally capacitors 516.

Further, FIG. 6 (including FIGS. 6-1, 6-2, and 6-3) particularly illustrates operation of transmitter 600 where transmit coil 610 is an MP-A13 coil configuration. However, embodiments can be applied to wireless power transmitters with any other coil configurations as well. For example, an MP-A11 coil configuration or any other coil configuration can be included.

The proposed measurement system has improved stability. Additionally, the measurement time (i.e. the time of operation in half-bridge mode) can be acceptable for most uses. In many embodiments, a measurement according to some embodiments of the present invention can be completed in about 10 ms. Further, the filter designs and the calculation is relatively simple. Additionally, components can be distributed among different boards. As is illustrated, the system can identify various FOs and RXs stably, especially when operating with the MP-A13 coil configuration. However, the circuit cost may be high and the specifications on various components may be high.

The following table provides a comparison of this oscillator technique, the frequency sweeping technique, and the ringing decay technique. As can be seen in the table, the current system has advantages and disadvantages in comparison with other techniques. However, with use with the MP-A13 coil configuration or with configurations similar to the MP-A13 coil configuration, oscillator techniques according to embodiments as described in this disclosure can be an overall superior solution for determining the Q-factor and detect FOs or receivers.

| Distinguishing Item | Frequency Sweeping | Ringing Decay | Oscillator method |
| --- | --- | --- | --- |
| Cost | 0.1 | 0.15 | 1 |
| PCB size | 0.15 | 0.3 | 1 |
| Stable results | Some applications acceptable and some are not. | Acceptable in most applications | Very good. |
| Distribution | Some customer's PCBs are acceptable, but some are not | Not good | Unknown |
| Temperature Effects | Theoretically Ok but no data | Fine | Raw test results are fine but need further testing |
| Design difficulty | Simple | Some careful tuning needed | Quick |
| Measurement Error | High | Acceptable, but affected by the inductors applied in the MP-A13 case | Best |
| Firmware complexity | High | Simple | Very Simple |
| FO/RX identification | Theoretically very good, but so far results have just been acceptable | Depends much on the resonant tank's resistance and the filter caps | Good |
| Measurement time | 100~800 ms | 1 ms | 1 ms~10 ms |

As indicated, stability, design difficulty, measurement error, firmware complexity, FO/RX identification, and measurement time of embodiments of the present invention are expected to be advantageous. However, cost and PCB size may not be advantageous. Further, distribution and temperature effects may or may not be advantageous.

Figures 1, 7A:
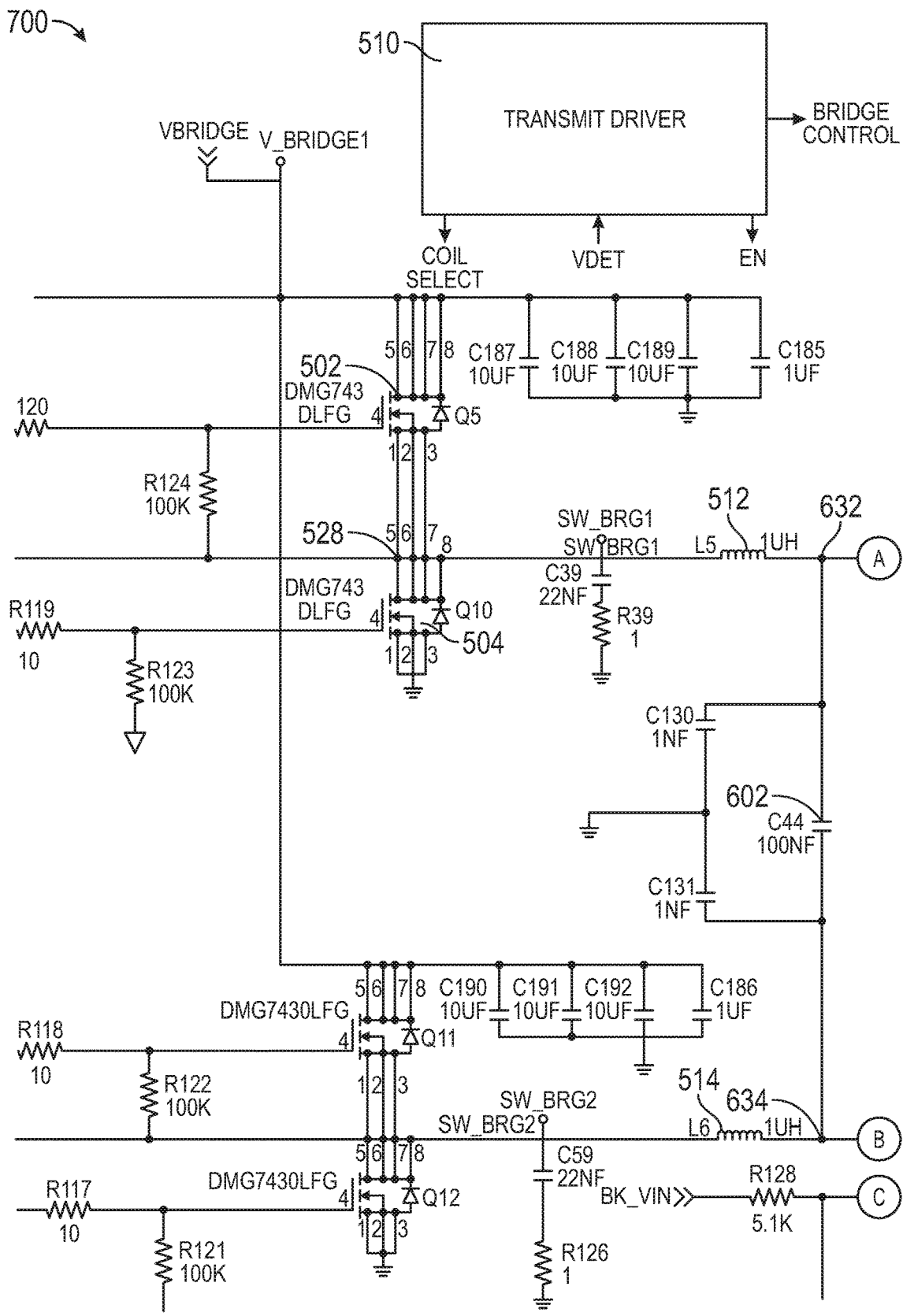
FIG. 7A (including FIGS. 7A-1 and 7A-2) and 7B illustrates another embodiment of the measurement as illustrated in FIGS. 5A, 5B, and 5C.
Figures 2, 7A:
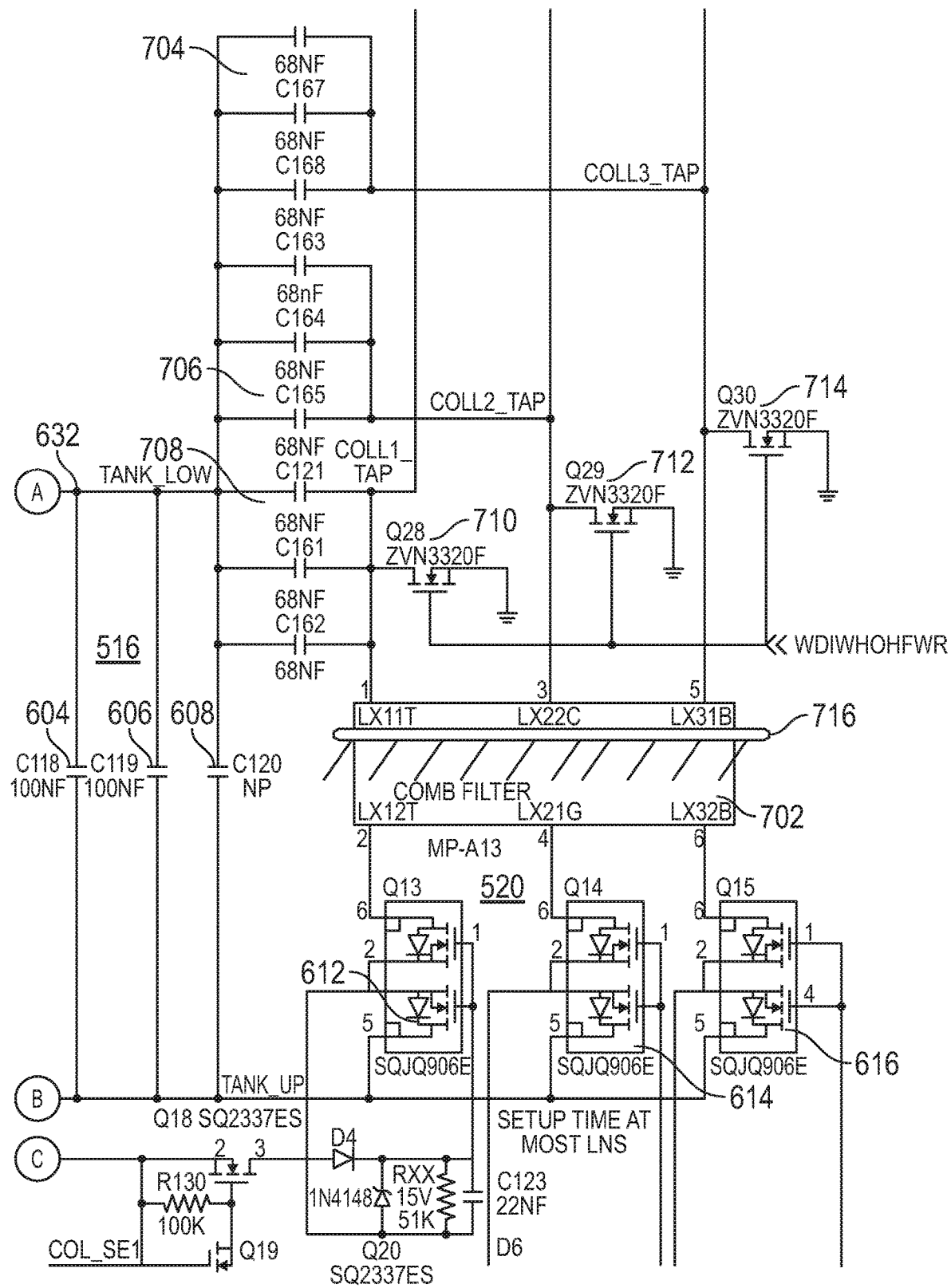

FIG. 7A (including FIGS. 7A-1 and 7A-2) and 7B illustrate a high power wireless power transmitter 700. As illustrated in FIG. 7A (including FIGS. 7A-1 and 7A-2), transmit coil 702 is a high power coil configuration, which may be an MP-A13 coil configuration, coupled to coil switches 612, 614, and 616. However, capacitors 618 and 620 are replaced with capacitances 704, 706, and 708 that are switched with coil switches 612, 614, and 616 with transistors 710, 712, and 714, respectively. In some embodiments, transmit coil 702 may include a comb filter 716 to filter signals through each of the three coils included in transmit coil 702.

Figure 7B:
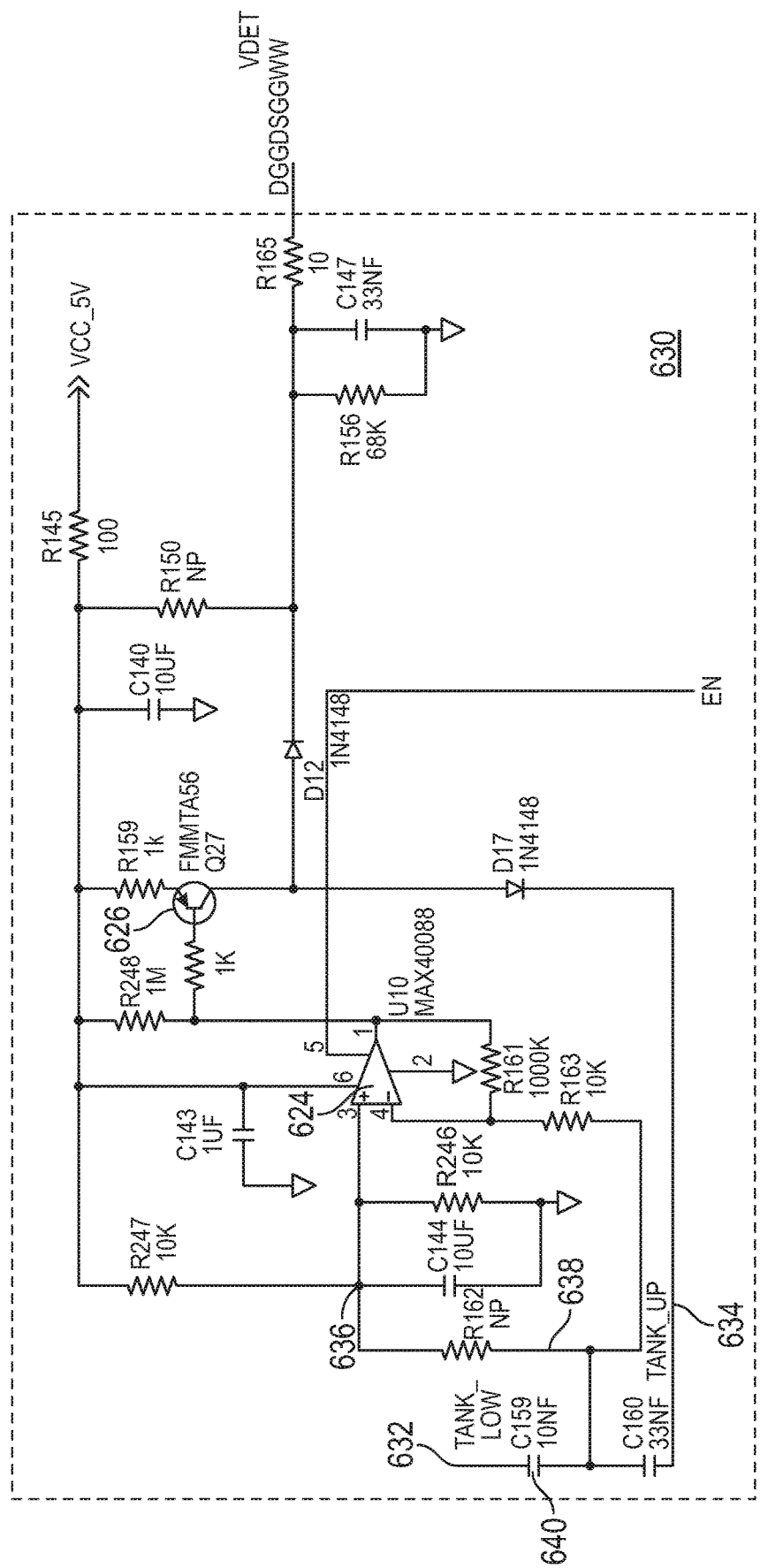

FIG. 7B illustrates in implementation of measurement circuit 630 for high power wireless power transmitter 700. As is illustrated in FIG. 7B, capacitive divider 640 is coupled between nodes 632 and 634 in this implementation instead of between transmit coil 701 and node 632 as illustrated in the implementation illustrated in FIG. 6 (including FIGS. 6-1, 6-2, and 6-3). Further, during set-up step 564 of method 560, transistors 710, 712, and 714 are turned on.

The above detailed description is provided to illustrate specific embodiments of the present invention and is not intended to be limiting. Numerous variations and modifications within the scope of the present invention are possible. The present invention is set forth in the following claims.

What is claimed is:

1. A wireless power transmitter, comprising:
   a transmit coil coupled between a first node and a second node;
   a first half-bridge circuit coupled between an input voltage and a ground, the first half-bridge circuit including a first transistor coupled between the input voltage and the first node and a second transistor coupled between the first node and the ground;
   a second half-bridge circuit coupled between the input voltage and the ground, the second half-bridge including a third transistor coupled between the input voltage and the second node and a fourth transistor coupled between the second node and the ground;
   a capacitor circuit having a plurality of capacitors coupled between the first node and the second node;
   a measurement circuit coupled to the capacitance circuit and to the first node; and
   a transmit driver coupled to provide a control signal to the measurement circuit, the first half-bridge circuit, and the second half-bridge circuit,
   wherein during a measurement test, the transmit driver configures the first half bridge circuit to turn the first transistor and the second transistor off, configures the second half-bridge circuit to turn the third transistor off and turn the fourth transistor on, and enables the measurement circuit to form an LC oscillating circuit between the input voltage and the ground that includes the transmit coil and the plurality of capacitors in the capacitor circuit, monitors a sinusoidal voltage across the transmit coil in the LC oscillating circuit to determine a voltage amplitude across the transmit coil, and determines a result from the voltage amplitude across the transmit coil, and
   wherein the capacitor circuit includes a capacitive divider formed in the LC oscillating circuit and the measurement circuit includes a bipolar junction transistor (BJT) coupled to the capacitive divider.

2. The transmitter of claim 1, wherein the result is a Q-factor, wherein the Q-factor is calculated from the voltage amplitude at the first node and a current amplitude at the first node determined by the transmit driver.

3. The transmitter of claim 1, wherein the result is indication of presence of a foreign object.

4. The transmitter of claim 1, wherein the second half-bridge circuit is coupled to the second node through an inductor.

5. The transmitter of claim 1, wherein the transmit coil is a configurable multi-coil system.

6. The transmitter of claim 1, wherein the transmit coil is configured for high power operation.

7. The transmitter of claim 1, wherein the transmit driver includes
a bridge driver having a first driver coupled to the first half-bridge and a second driver coupled to the second half bridge;
an analog-to-digital converter coupled to receive analog signals and provide digital signal; and
a processor, the processor coupled to the bridge driver and to the analog-to-digital converter, the processor executing instructions to
adjust the input voltage;
configure the first transistor and the second transistor of the first half-bridge circuit for the measurement test;
configure the third transistor and the fourth transistor of the second half-bridge circuit for the measurement test;
enable the measurement circuit;
receive the sinusoidal voltage during the measurement test; and
provide the voltage amplitude based on the sinusoidal voltage.

8. A wireless power transmitter, comprising:
a transmit coil coupled between a first node and a second node;
a first half-bridge circuit coupled between an input voltage and a ground, the first half-bridge circuit including a first transistor coupled between the input voltage and the first node and a second transistor coupled between the first node and the ground;
a second half-bridge circuit coupled between the input voltage and the ground, the second half-bridge including a third transistor coupled between the input voltage and the second node and a fourth transistor coupled between the second node and the ground;
a capacitor circuit having a plurality of capacitors coupled between the first node and the second node;
a measurement circuit coupled to the capacitance circuit and to the first node; and
a transmit driver coupled to provide a control signal to the measurement circuit, the first half-bridge circuit, and the second half-bridge circuit,
wherein during a measurement test, the transmit driver configures the first half bridge circuit to turn the first transistor and the second transistor off, configures the second half-bridge circuit to turn the third transistor off and turn the fourth transistor on, and enables the measurement circuit to form an LC oscillating circuit between the input voltage and the ground that includes the transmit coil and the plurality of capacitors in the capacitor circuit, monitors a sinusoidal voltage across the transmit coil in the LC oscillating circuit to determine a voltage amplitude across the transmit coil, and determines a result from the voltage amplitude across the transmit coil, and
wherein the capacitor circuit includes a capacitive divider formed in the LC oscillating circuit and the measurement circuit includes an amplifier coupled to the capacitive divider.

9. The transmitter of claim 8, wherein the result is a Q-factor, wherein the Q-factor is calculated from the voltage amplitude at the first node and a current amplitude at the first node determined by the transmit driver.

10. The transmitter of claim 8, wherein the result is indication of presence of a foreign object.

11. The transmitter of claim 8, wherein the second half-bridge circuit is coupled to the second node through an inductor.

12. The transmitter of claim 8, wherein the transmit coil is a configurable multi-coil system.

13. The transmitter of claim 8, wherein the transmit coil is configured for high power operation.

14. The transmitter of claim 8, wherein the transmit driver includes
a bridge driver having a first driver coupled to the first half-bridge and a second driver coupled to the second half bridge;
an analog-to-digital converter coupled to receive analog signals and provide digital signal; and
a processor, the processor coupled to the bridge driver and to the analog-to-digital converter, the processor executing instructions to
adjust the input voltage;
configure the first transistor and the second transistor of the first half-bridge circuit for the measurement test;
configure the third transistor and the fourth transistor of the second half-bridge circuit for the measurement test;
enable the measurement circuit;
receive the sinusoidal voltage during the measurement test; and
provide the voltage amplitude based on the sinusoidal voltage.

15. A method of performing a measurement test in a wireless power transmitter, comprising:
adjusting an input voltage to a bridge circuit, the bridge circuit includes a first half bridge with a first transistor coupled between the input voltage and a first node and a second transistor coupled between the first node and a ground and a second half bridge with a third transistor coupled between the input voltage and a second node and a fourth transistor coupled between the second node and the ground;
setting up the bridge circuit by turning the first transistor, the second transistor, and the third transistor off and turning the fourth transistor on to form an LC oscillating circuit that includes a transmit coil and a capacitor circuit coupled between the first node and the second node;
enabling a measurement circuit that is coupled to the transmit coil and the capacitor circuit;
measuring a VDET voltage amplitude across the transmit coil from the LC oscillating circuit when the measurement circuit is enabled; and
determining a result from the VDET voltage amplitude,
forming a capacitive divider in the LC oscillating circuit and wherein measuring the VDET voltage amplitude includes providing bipolar junction transistor (BJT) coupled to the capacitive divider.

16. The method of claim 15, wherein the transmit coil is driven by the first half-bridge circuit during power transfer.

17. The method of claim 15, wherein the transmit coil is driven by the full-bridge circuit formed by the first half-bridge circuit and the second half-bridge circuit during power transmission.

18. The method of claim 15, wherein determining a result includes calculating a Q-factor from the VDET voltage amplitude.

19. The method of claim 15, wherein determining a result includes detecting presence of a foreign object from an amplitude of the VDET voltage amplitude.

20. The method of claim 15, wherein adjusting the input voltage to the bridge circuit includes setting the input voltage at a level that prevents conduction through internal diodes of transistors in the bridge circuit during the measurement test.

21. The method of claim 15, wherein the transmit coil is a configurable multi-coil system and setting up the bridge circuit includes setting transistors in the bridge circuit and the configurable multi-coil system.

22. The method of claim 15, wherein the transmit coil is configured for high power operation.

23. The method of claim 15, wherein the first node is coupled to the first half-bridge circuit through an inductor.

24. The method of claim 15, wherein the first node is coupled to the first half-bridge circuit through an inductor.

25. A method of performing a measurement test in a wireless power transmitter, comprising:
  adjusting an input voltage to a bridge circuit, the bridge circuit includes a first half bridge with a first transistor coupled between the input voltage and a first node and a second transistor coupled between the first node and a ground and a second half bridge with a third transistor coupled between the input voltage and a second node and a fourth transistor coupled between the second node and the ground;
  setting up the bridge circuit by turning the first transistor, the second transistor, and the third transistor off and turning the fourth transistor on to form an LC oscillating circuit that includes a transmit coil and a capacitor circuit coupled between the first node and the second node;
  enabling a measurement circuit that is coupled to the transmit coil and the capacitor circuit;
  measuring a VDET voltage amplitude across the transmit coil from the LC oscillating circuit when the measurement circuit is enabled; and
  determining a result from the VDET voltage amplitude,
  forming a capacitive divider in the LC oscillating circuit and wherein measuring the VDET sinusoidal voltage includes providing an operational amplifier coupled to the capacitive divider.

26. The method of claim 25, wherein the transmit coil is driven by the first half-bridge circuit during power transfer.

27. The method of claim 25, wherein the transmit coil is driven by the full-bridge circuit formed by the first half-bridge circuit and the second half-bridge circuit during power transmission.

28. The method of claim 25, wherein determining a result includes calculating a Q-factor from the VDET voltage amplitude.

29. The method of claim 25, wherein determining a result includes detecting presence of a foreign object from an amplitude of the VDET voltage amplitude.

30. The method of claim 25, wherein adjusting the input voltage to the bridge circuit includes setting the input voltage at a level that prevents conduction through internal diodes of transistors in the bridge circuit during the measurement test.

31. The method of claim 25, wherein the transmit coil is a configurable multi-coil system and setting up the bridge circuit includes setting transistors in the bridge circuit and the configurable multi-coil system.

32. The method of claim 25, wherein the transmit coil is configured for high power operation.

* * * * *